US010371197B2

(12) United States Patent
Vogt et al.

(10) Patent No.: US 10,371,197 B2
(45) Date of Patent: Aug. 6, 2019

(54) FOIL SEGMENT BEARING, METHOD FOR SETTING A GAP GEOMETRY OF A FOIL SEGMENT BEARING AND CORRESPONDING PRODUCTION METHOD

(71) Applicant: Robert Bosch GmbH, Stuttgart (DE)

(72) Inventors: Andreas Vogt, Renningen (DE); Jochen Doehring, Stuttgart-Stammheim (DE)

(73) Assignee: Robert Bosch DE, Stuttgart (DE)

( * ) Notice: Subject to any disclaimer, the term of this patent is extended or adjusted under 35 U.S.C. 154(b) by 68 days.

(21) Appl. No.: 15/537,712

(22) PCT Filed: Dec. 8, 2015

(86) PCT No.: PCT/EP2015/078924
§ 371 (c)(1),
(2) Date: Jun. 19, 2017

(87) PCT Pub. No.: WO2016/102181
PCT Pub. Date: Jun. 30, 2016

(65) Prior Publication Data
US 2017/0350444 A1    Dec. 7, 2017

(30) Foreign Application Priority Data

Dec. 22, 2014  (DE) .......................... 10 2014 226 807

(51) Int. Cl.
*F16C 17/02*   (2006.01)
*F16C 17/03*   (2006.01)
(Continued)

(52) U.S. Cl.
CPC ............ *F16C 17/024* (2013.01); *F16C 17/03* (2013.01); *F16C 17/035* (2013.01); *F16C 23/04* (2013.01);
(Continued)

(58) Field of Classification Search
CPC ...... F16C 17/03; F16C 17/024; F16C 17/042; F16C 25/04; F16C 17/035; F16C 23/04; F16C 33/14; F16C 43/02; F16C 2360/24
(Continued)

(56) References Cited

U.S. PATENT DOCUMENTS 3,985,405 A * 10/1976 Okano ..................... F16C 17/03
384/117
4,368,853 A *  1/1983 Morishita ............. B05B 5/0415
239/223
(Continued)

FOREIGN PATENT DOCUMENTS

CN     101225853 A    7/2008
CN     103335019 A   10/2013
(Continued)

OTHER PUBLICATIONS

International Search Report corresponding to PCT Application No. PCT/EP2015/078924, dated Jan. 22, 2016 (German and English language document) (5 pages).

*Primary Examiner* — Marcus Charles
(74) *Attorney, Agent, or Firm* — Maginot, Moore & Beck LLP

(57) ABSTRACT

A foil segment bearing comprises a bearing backing with a through opening. A shaft is arranged in the through opening such that a gap exists between the shaft and the bearing backing. The foil segment bearing also has at least one first bearing segment and one second bearing segment with respective inner surfaces. Each of the respective inner surfaces defines a bearing surface with an adjustable circumference. The bearing segments are arranged in the bearing backing at a distance from the shaft such that a gap exists between the shaft and the bearing segments. The foil segment bearing also has a foil arrangement arranged in the gap between the inner surfaces of the bearing segments and the (Continued)

shaft. The foil segment bearing also has an adjustment mechanism configured to set a geometry of the gap.

11 Claims, 4 Drawing Sheets

(51) Int. Cl.
    *F16C 33/14*     (2006.01)
    *F16C 43/02*     (2006.01)
    *F16C 25/04*     (2006.01)
    *F16C 23/04*     (2006.01)

(52) U.S. Cl.
    CPC .............. *F16C 33/14* (2013.01); *F16C 43/02* (2013.01); *F16C 2360/24* (2013.01)

(58) Field of Classification Search
    USPC ....... 384/103, 106, 114, 117, 125, 145, 306, 384/308–309, 116, 119
    See application file for complete search history.

(56) References Cited

U.S. PATENT DOCUMENTS

| | | | | |
|---|---|---|---|---|
| 4,469,453 A | * | 9/1984 | Kozawa | F16C 17/03 310/90 |
| 5,518,320 A | * | 5/1996 | Mohamed | F16C 17/024 384/103 |
| 5,911,511 A | * | 6/1999 | Saville | F16C 17/024 384/103 |
| 6,024,491 A | * | 2/2000 | Bak | F16C 17/024 384/103 |
| 6,623,164 B1 | * | 9/2003 | Gozdawa | F16C 17/03 384/117 |
| 7,614,792 B2 | * | 11/2009 | Wade | F16C 17/024 384/103 |
| 2002/0097930 A1 | | 7/2002 | Lee et al. | |
| 2003/0118257 A1 | | 6/2003 | Lee et al. | |
| 2004/0042691 A1 | | 3/2004 | Matsunaga | |
| 2015/0362012 A1 | * | 12/2015 | Ermilov | F16C 17/024 384/105 |

FOREIGN PATENT DOCUMENTS

| | | | |
|---|---|---|---|
| CN | 104653598 A | 5/2015 | |
| DE | 102014226840 A1 * | 6/2016 | ............ F16C 17/024 |
| JP | 60208627 A * | 10/1985 | ............ F16C 17/024 |
| JP | 61-91623 U | 6/1986 | |
| JP | 01-67329 U | 4/1989 | |
| JP | 2003-74550 A | 3/2003 | |
| JP | 2003074550 A * | 3/2003 | ............ F16C 17/024 |
| KR | 2001-0096631 A | 11/2001 | |
| KR | 100759599 B1 * | 9/2007 | |
| RU | 2012 146 614 A | 5/2014 | |
| WO | 2014/070046 A1 | 5/2014 | |

* cited by examiner

FOIL SEGMENT BEARING, METHOD FOR SETTING A GAP GEOMETRY OF A FOIL SEGMENT BEARING AND CORRESPONDING PRODUCTION METHOD

PRIORITY CLAIM

This application is a 35 U.S.C. § 371 National Stage Application of PCT/EP2015/078924, filed on Dec. 8, 2015, which claims the benefit of priority to Serial No. DE 10 2014 226 807.9, filed on Dec. 22, 2014 in Germany, the disclosures of which are incorporated herein by reference in their entireties.

The disclosure relates to a foil segment bearing, to a method for setting a gap geometry of a foil segment bearing and to a corresponding production method.

BACKGROUND

Foil bearings are used in a multiplicity of applications, particularly in high-speed applications, for example in thermal flow machines, turbochargers, compressors, etc.

Foil bearings are a special type of plain bearing. They are aerodynamic bearings which are designed for high rotational speed. Foil bearings of the first generation consist of what is referred to as the top foil, the supporting foil and the bearing back. In order to improve the stability of a shaft in said bearing back, a plurality of, typically three, seal shim rings (what are referred to as "shims") distributed over the circumference are placed between the bearing back and the supporting foil. Without such seal shim rings, the aerodynamic buildup of pressure only takes place at a point in the circumferential direction of the shaft, namely where the shaft is caused by an external force to lie against the top foil.

FIG. 4 shows a schematic view for explaining an example of a foil bearing 400 without seal shim rings.

The foil bearing 400 has a bearing back 101, a shaft 103, a foil arrangement 107 with a top foil 107b and a supporting foil 107a. The foil arrangement 107 is arranged in a gap 403 between the shaft 103 and the bearing back 101. In FIG. 3, the shaft 103 lies against the top foil 107b only at one cross-sectional point. This gives rise to a gap 403 which narrows in the circumferential direction and in which the hydrodynamic or aerodynamic pressure can build up. The distribution of pressure in the foil bearing is sketched schematically with the curve 401.

FIG. 5 illustrates a further example of a foil bearing 500 with seal shim rings 501, 503, 505.

The foil bearing 500 has a bearing back 101, a shaft 103, a foil arrangement 507, 507', 507" each having a top foil 507b and a supporting foil 507a. The foil arrangement 107 is arranged in a gap 509 between the shaft 103 and the bearing back 101. In order to stabilize the shaft, the seal shim rings 501, 503, 505 are additionally arranged in the gap.

It can be seen in FIG. 5 that, by means of the seal shim rings 501, 503, 505, narrowing gaps arise at a plurality of points over the bearing circumference between the shaft 103 and the top foil 507b. At each of said narrowing portion, an aerodynamic pressure builds up in each case, said aerodynamic pressure supporting the shaft and positioning the latter in the radial direction. The position and the height of the seal shim rings 501, 503, 505 define the geometry of the construction. However, after the foil arrangement 507, 507', 507" and the seal shim rings 501, 503, 505 are installed, the geometry of the bearing 500 can no longer be changed, and the position and the strength of the pressure gradients are then only still dependent on the operating conditions (speed, viscosity of the medium and the temperature).

US 2004/0042691 A1 discloses a foil bearing with a plurality of foils which are in the shape of segments of a cylinder and are arranged in a gap between a shaft and a bearing back. The bearing back here is pierced by pins, wherein the length by which the pins project out of the bearing back can be set by a rotatable ring surrounding the bearing back.

US 2003/0118257 A1 shows a foil bearing with a multiplicity of piezoelectric actuators. The foil bearing comprises a housing and also a plurality of foils for supporting a rotating shaft. The piezoelectric actuators are designed to set the stiffness and the damping coefficient of the bearing.

SUMMARY

The disclosure provides a foil segment bearing, a method for setting a gap geometry of a foil bearing and a corresponding production method.

Preferred developments are the subject matter of the following description.

The concept on which the present disclosure is based consists in maintaining a gap geometry of a foil bearing in a variable manner by means of bearing segments and a setting mechanism.

The present disclosure therefore permits compensation of manufacturing tolerances in the production of foil bearings, due to which manufacturing tolerances the gap geometry of a foil bearing may vary. In this connection, a gap which is too large is disadvantageous for the efficiency of the bearing. In the case of a gap geometry which is too small, rubbing of the wheels on the housing may occur with subsequent breakdown of the flow machine. By means of the retrospective setting of the gap geometry, which setting is provided with the present disclosure, manufacturing tolerances can be corrected and in particular the shaft can be positioned in the radial direction.

By the gap geometry between the shaft and the bearing being able to be set in a flexible manner, the supporting behavior of a foil bearing can therefore also be set flexibly.

According to a preferred development, the setting mechanism has a spring and a pin, wherein the spring can be positioned in the axial direction by the pin, and the spring in particular has a dynamic spring hardness. The term "dynamic spring hardness" includes variable spring hardnesses which can be set and/or can be controlled. By means of the sprung setting mechanism, the bearing segments are also sprung at the rear, and therefore the latter can yield during fitting so as not to damage the foils. Furthermore, the centering of the shaft arises virtually entirely independently because of the rear springing of the bearing segments. A dynamic spring hardness has proven particularly advantageous since the rigidity of the system can therefore be adapted to different operating conditions.

According to a further preferred development, a bearing segment is in each case assigned a setting mechanism, and the setting mechanism is at least partially arranged in the bearing back. By means of the precise allocation of setting mechanisms to bearing segments, the position of the bearing segments can be set individually and optionally differently. By means of this arrangement of the setting mechanism in the bearing back, an embodiment of the setting mechanism that is particularly flexible and easy to handle is provided.

According to a further preferred development, a pin is connected to in each case one bearing segment. Accordingly, a plurality of pins can be assigned to one bearing segment, but only one bearing segment to one pin. By this means, a bearing segment can be held particularly simply, but stably, in a predetermined position.

According to a further preferred development, the bearing segments each have a recess which is designed in a manner corresponding to a head portion of the pins, and the head portion is arranged in the recess. By means of the arrangement of the head portion of a pin in the recess of a bearing segment, a bearing segment can be fixed in a stable manner.

According to a further preferred development, the foil segment bearing has at least three bearing segments. By this means, the shaft can be aligned precisely and centrally, with little outlay on installation and manufacturing.

According to a further preferred development, the bearing segments are spaced apart from one another in the circumferential direction by an angle with respect to one another. The angle between two adjacent bearing segment edges can be set between 5° and 20°, in particular between 10° and 15°. These delimitation details of the angles constitute a maximum range of the settable gap geometry with sufficient mechanical stability of the foil segment bearing.

According to a further preferred development, the foil arrangement has a first substantially annular foil and a second substantially annular foil, wherein the foils are fastened on a bearing segment. The term "annular" should be understood in particular not as meaning a delimitation to round embodiments. The detail "substantially annular" is intended to specify that a foil does not have to encircle a full circle, but rather merely a large part of a full circle. In order to prevent changes to the foils because of temperature fluctuations, a first and a second foil end are spaced apart at least by 0.1 mm. In order to ensure sufficient stability, the foils are intended, however, to encircle at least an angle of 350°. The By means of the two substantially annular foils, sufficient flexibility of the settable gap geometry and sufficient stability of the foil segment bearing arrangement are ensured. The foils can be fastened on a bearing segment by means of a joining method. Joining methods include adhesive bonding, screwing, clamping, etc.

BRIEF DESCRIPTION OF THE DRAWINGS

Further features and advantages of the present disclosure are explained below using embodiments with reference to the figures.

In the figures.

DETAILED DESCRIPTION

The same reference signs denote identical or functionally identical elements in the figures.

Figure 1:
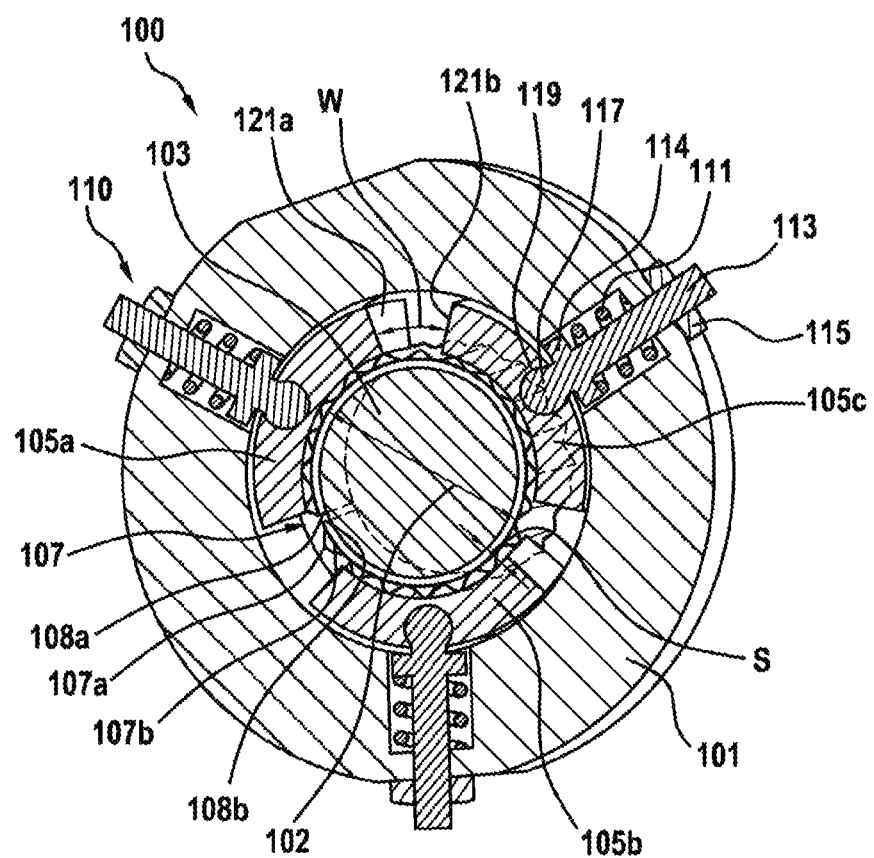
FIG. 1 shows a schematic cross-sectional view of a foil segment bearing according to an embodiment of the present disclosure.

FIG. 1 shows a schematic cross-sectional view of a foil segment bearing 100 according to an embodiment of the present disclosure. In FIG. 1, the foil segment bearing 100 has a bearing back 101, a setting mechanism 110, a foil arrangement 107 and bearing segments 105a-105c.

The foil bearing 100 is bounded in this case by a bearing back 101. The setting mechanism 110 is arranged within the bearing back 101 and is designed as a pin 113 which is positioned in the axial direction by a spring 111. The spring 111 can have a dynamic spring hardness. The setting mechanism 110 is arranged for the most part within the bearing back 101. To connect a pin 113 to a bearing segment, the pin 113 has a head portion 117. The position of a pin is stiff to a greater or lesser extent depending on the spring hardness which is set. In order to fix the pin 113 in its position, the setting mechanism also has a stop 115. The bearing segments 105a-105c are arranged within the bearing back and have a recess 119 corresponding to the head portion 117 of the pin 113. The bearing segments 105a-105c are connected to the pin by the head portion 117 of the pin 113, which head portion is inserted in the recess 119.

The foil arrangement 107 comprises two foils, a first foil 107a and a second foil 107b. The first foil 107a is designed here as a supporting foil and the second foil 107b as the top foil.

In this embodiment, the foils 107a,b are designed in the shape of segments of a cylinder. However, it should be noted that the foils 107a,b can also be of another shape without departing from the scope of protection of the disclosure. The foils 107a,b are fastened at a respective first end 108a to the bearing segment 105a. A second end 108b of the foils 107a,b is spaced apart from the first end 108a of the foils by a small angle W of approximately 20° and is not fastened to any bearing segment. The width of the gap S of the foil bearing 100 according to the disclosure can vary by approx. 100 μm 400 μm by means of the setting mechanism.

Figure 2:
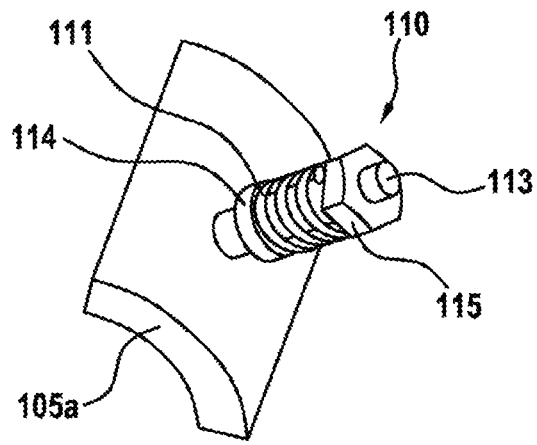
FIG. 2 shows a schematic perspective view of a setting mechanism with a bearing segment according to an embodiment of the present disclosure according to FIG. 1.

FIG. 2 shows a schematic perspective view of a setting mechanism 110 with a bearing segment 105a according to an embodiment of the present disclosure according to FIG. 1.

FIG. 2 illustrates the setting mechanism 110 which is formed by the spring 111, the pin 113 and the stop 115 and is connected to a bearing segment 105a. At a first shaft-side end of the pin 113, the pin is inserted into the bearing segment 105a. The pin 113 has an integral stop 114 which can be subjected to a spring force. A further stop 115 which is designed as a nut is arranged on a bearing-back-side end of the pin 113. The spring 111 which is designed as a spiral spring is tensioned between the two stops 114 and 115. Depending on the position of the stop element 115, the spring 111 exerts a force which, in the fitted state, is directed toward the shaft 103. The spring force is transferred by the pin 113 to the bearing segment 105a, as a result of which the bearing segment 105a is positioned in the axial direction.

Figure 3:
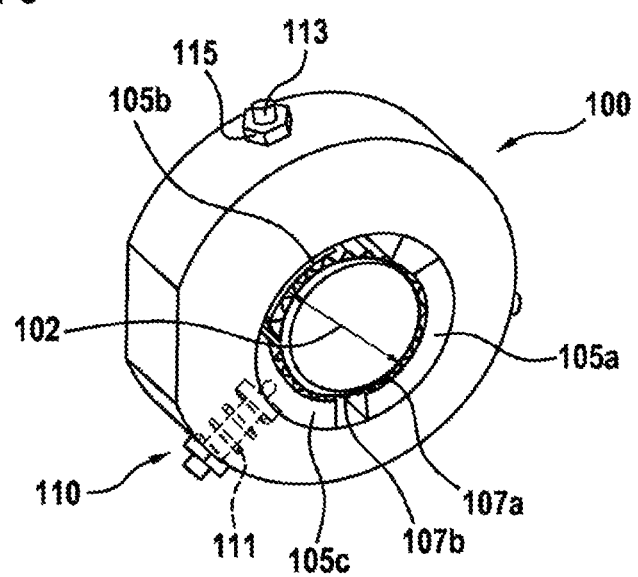
FIG. 3 shows a perspective schematic view of a foil segment bearing according to FIG. 1 according to an embodiment of the present disclosure.
Figure 4:
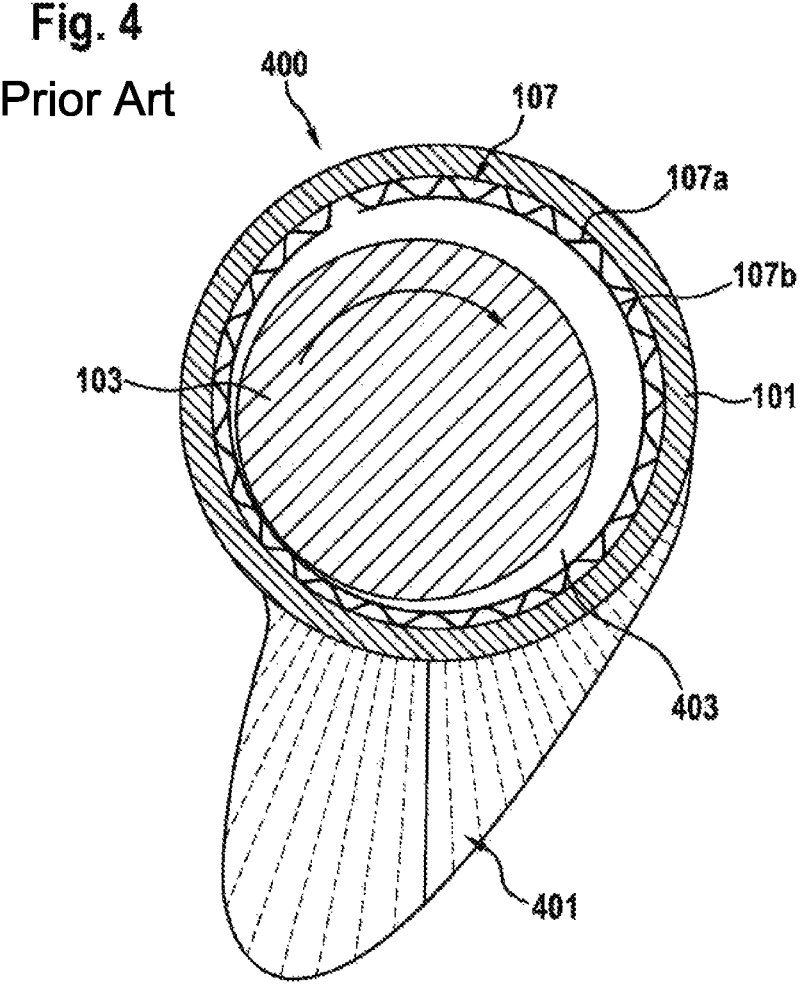
FIG. 4 shows a schematic cross-sectional view of an example of a foil bearing.
Figure 5:
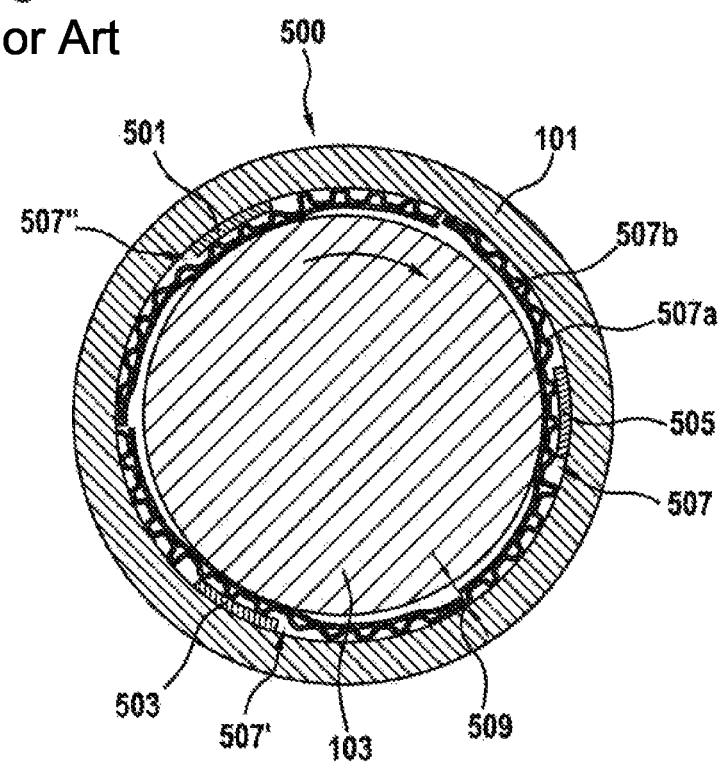
FIG. 5 shows a schematic cross-sectional view of an example of a foil bearing.

FIG. 3 shows a perspective schematic view of a foil segment bearing according to FIG. 1.

Although the present disclosure has been described with reference to preferred exemplary embodiments, it is not restricted thereto. In particular, the materials and topologies mentioned are merely by way of example and are not restricted to the explanatory examples.

The design of the foil segment bearing is not restricted to the above-described embodiments, but rather can be adapted as desired to the particular application. For example, the number of springs and pins of a setting mechanism can be adapted to the prevailing conditions. Furthermore, the shape of the foil segment bearing, of the bearing back, of the foil arrangement and of the shaft is not restricted to the cylinder shape illustrated.

The disclosure can be used in all foil segment bearings, the construction of which already includes what is referred to as a "bump foil" and what is referred to as a "top foil".

The invention claimed is:

1. A foil segment bearing, comprising:
   a bearing back with a passage opening, the passage opening configured to receive a shaft arranged therein such that there is a gap between the shaft and the bearing back;
   at least one first bearing segment and one second bearing segment, each of the bearing segments having a respective inner surface defining a bearing surface with an adjustable circumference, each of the bearing segments configured to be arranged in the bearing back spaced apart from the shaft such that there is a further gap between the shaft and each of the bearing segments;
   a foil arrangement arranged in the further gap between the inner surfaces of the bearing segments and the shaft; and
   at least one setting mechanism configured to set a geometry of the further gap via a radial positioning of the bearing segments, the at least one setting mechanism including a spring and a pin, the spring arranged in the bearing back radially outwardly of the passage opening.

2. The foil segment bearing as claimed in claim 1, wherein:
   the spring is configured to be positioned in an axial direction by the pin, and
   the spring has a dynamic spring hardness.

3. The foil segment bearing as claimed in claim 1, wherein:
   the at least one setting mechanism is a plurality of setting mechanisms;
   each of the bearing segments is assigned one of the plurality setting mechanisms, and
   each of the setting mechanisms is at least partially arranged in the bearing back.

4. The foil segment bearing as claimed in claim 1, wherein:
   the at least one setting mechanism is a plurality of setting mechanisms, and
   the pin of each of the setting mechanisms is connected to a respective bearing segment.

5. The foil segment bearing as claimed in claim 4, wherein:
   each of the bearing segments has a recess corresponding to a head portion of each of the pins, and each head portion is arranged in the recess of the respective bearing segment.

6. The foil segment bearing as claimed in claim 1, wherein the foil segment bearing has at least three bearing segments.

7. The foil segment bearing as claimed in claim 1, wherein:
   the bearing segments are spaced apart from each other in a circumferential direction by an angle, and
   the angle between two adjacent bearing segment edges is set between 5° and 20°.

8. The foil segment bearing as claimed in claim 7, wherein the angle between two adjacent bearing segment edges is set between 10° and 15°.

9. The foil segment bearing as claimed in claim 1, wherein:
   the foil arrangement has a first substantially annular foil and a second substantially annular foil, and
   each of the foils is fastened on one bearing segment.

10. A method for setting a gap geometry of a foil segment bearing, comprising:
    providing the foil segment bearing, including:
       a bearing back with a passage opening configured to receive a shaft such that there is a first gap between the shaft and the bearing back;
       at least one first bearing segment and one second bearing segment, each of the bearing segments having a respective inner surface defining a bearing surface with an adjustable circumference, each of the bearing segments configured to be arranged in the bearing back spaced apart from the shaft such that there is a further gap between the shaft and each of the bearing segments;
       a foil arrangement arranged in the further gap between the inner surfaces of the bearing segments and the shaft; and
       at least one setting mechanism configured to set a geometry of the further gap via a radial positioning of the bearing segments, the at least one setting mechanism including a spring and a pin, the spring arranged in the bearing back radially outwardly of the passage opening;
    determining at least one of an operating state and a rotational speed of the shaft mounted in the foil segment bearing;
    determining a suitable gap geometry using the at least one of the determined operating state and rotational speed; and
    positioning the at least one setting mechanism using the determined, suitable gap geometry.

11. A production method for a foil segment bearing, comprising:
    providing a bearing back with a passage opening, the passage opening configured to receive a shaft arranged therein such that there is a gap between the shaft and the bearing back;
    providing a first bearing segment and a second bearing segment, each of the bearing segments having a respective inner surface defining a bearing surface with an adjustable circumference, each of the bearing segments configured to be arranged in the bearing back in a manner spaced apart from the shaft such that there is a further gap between the shaft and each of the bearing segments;
    providing a foil arrangement;
    providing at least one setting mechanism configured to set a geometry of the further gap via a radial positioning of the bearing segments, the at least one setting mechanism including a spring and a pin;
    arranging the first and second bearing segments in the passage opening;
    arranging the setting mechanism within the bearing back such that the spring is arranged radially outwardly of the passage opening;
    connecting the first and the second bearing segments with the setting mechanism; and
    arranging the foil arrangement in the further gap between the inner surfaces of the first and second bearing segments and the shaft.

* * * * *

UNITED STATES PATENT AND TRADEMARK OFFICE
CERTIFICATE OF CORRECTION

PATENT NO.           : 10,371,197 B2
APPLICATION NO.      : 15/537712
DATED                : August 6, 2019
INVENTOR(S)          : Andreas Vogt et al.

It is certified that error appears in the above-identified patent and that said Letters Patent is hereby corrected as shown below:

On the Title Page

At "(73) Assignee:"
Replace "Robert Bosch DE"
With --Robert Bosch GmbH--

Signed and Sealed this
Twenty-first Day of January, 2020

Andrei Iancu
*Director of the United States Patent and Trademark Office*